US011954484B2

(12) United States Patent
Novak

(10) Patent No.: US 11,954,484 B2
(45) Date of Patent: Apr. 9, 2024

(54) METHOD AND SYSTEM FOR GRAPH-BASED APPLICATION MODELING

(71) Applicant: JPMorgan Chase Bank, N.A., New York, NY (US)

(72) Inventor: Mark F Novak, Newcastle, WA (US)

(73) Assignee: JPMORGAN CHASE BANK, N.A., New York, NY (US)

(*) Notice: Subject to any disclaimer, the term of this patent is extended or adjusted under 35 U.S.C. 154(b) by 269 days.

(21) Appl. No.: 17/648,970

(22) Filed: Jan. 26, 2022

(65) Prior Publication Data

US 2022/0244950 A1 Aug. 4, 2022

Related U.S. Application Data

(60) Provisional application No. 63/145,089, filed on Feb. 3, 2021.

(51) Int. Cl.
*G06F 8/71* (2018.01)
*G06F 11/34* (2006.01)
*G06F 21/57* (2013.01)
*H04L 9/40* (2022.01)

(52) U.S. Cl.
CPC ............ *G06F 8/71* (2013.01); *G06F 11/3409* (2013.01); *G06F 21/577* (2013.01); *H04L 63/1433* (2013.01); *G06F 2221/033* (2013.01)

(58) Field of Classification Search
CPC ...... G06F 8/71; G06F 11/3409; G06F 21/577; G06F 2221/033; G06F 8/70; G06F 8/20; G06F 8/00; H04L 63/1433
See application file for complete search history.

(56) References Cited

U.S. PATENT DOCUMENTS

| 11,366,658 | B1* | 6/2022 | Wilhelm | G06F 9/44526 |
| 2014/0282370 | A1* | 9/2014 | Schaefer | G06F 8/70 717/104 |
| 2016/0085659 | A1* | 3/2016 | Schmitt | G06F 11/3616 717/126 |
| 2017/0286068 | A1* | 10/2017 | Shiokawa | G06F 8/36 |

(Continued)

OTHER PUBLICATIONS

Yoshiszawa et al., "Verifying Implementation of Security Design Patterns Using a Test Template," 2014 Ninth International Conference on Availability, Reliability and Security Year: 2014 | Conference Paper | Publisher: IEEE.*

(Continued)

*Primary Examiner* — Roderick Tolentino
(74) *Attorney, Agent, or Firm* — Greenblum & Bernstein, P.L.C.

(57) ABSTRACT

A method for providing graph-based application modeling to facilitate application lifecycle management is disclosed. The method includes receiving, via a graphical user interface, an input, the input relating to a request to design and develop an application; determining, based on the input, a model development plan, the model development plan including a universal schema that is compatible with a variety of application development schemas; generating a model based on the model development plan and the input, the model relating to an illustration of a topology corresponding to the application; associating the model with the application; storing the model and the association in a model repository; and exposing the model via a network interface.

20 Claims, 6 Drawing Sheets

(56) References Cited

U.S. PATENT DOCUMENTS

| | | | | |
|---|---|---|---|---|
| 2020/0133651 A1* | 4/2020 | Holzer | ...................... | G06F 8/65 |
| 2020/0201293 A1* | 6/2020 | Hou | ...................... | G06N 5/022 |
| 2020/0334711 A1* | 10/2020 | Tonnison | ............ | G06Q 20/065 |
| 2021/0073676 A1* | 3/2021 | Moriya | ............... | G06F 11/3476 |
| 2021/0200840 A1* | 7/2021 | Kannan | .................... | G06F 8/73 |
| 2022/0164477 A1* | 5/2022 | Patodia | ............... | G06F 21/6254 |

OTHER PUBLICATIONS

Park et al., "The BCD View Model: Business Analysis View, Service Composition View and Service Design View for Service Oriented Software Design and Development," 2008 12th IEEE International Workshop on Future Trends of Distributed Computing Systems Year: 2008 | Conference Paper | Publisher: IEEE.*

* cited by examiner

METHOD AND SYSTEM FOR GRAPH-BASED APPLICATION MODELING

CROSS-REFERENCE TO RELATED APPLICATIONS

This application claims the benefit of U.S. Provisional Patent Application Ser. No. 63/145,089, filed Feb. 3, 2021, which is hereby incorporated by reference in its entirety.

BACKGROUND

1. Field of the Disclosure

This technology generally relates to methods and systems for application modeling, and more particularly to methods and systems for providing graph-based modeling of cloud applications to facilitate lifecycle management as well as resiliency, threat, and control evaluations.

2. Background Information

Many business entities utilize expansive cloud-based enterprise networks to facilitate business operations. These enterprise networks commonly include software such as, for example, cloud applications that users may access primarily through a network interface. Historically, conventional methodologies for developing the cloud applications have resulted in varying degrees of success with respect to satisfying considerations such as, for example, compliance considerations, resiliency considerations, and threat considerations.

One drawback of using conventional methodologies to satisfy considerations for the cloud applications is that in many instances, the considerations must be manually evaluated independently. As a result, the manual evaluation of compliance considerations, resiliency considerations, and threat considerations for each cloud application requires a large investment of resources such as, for example, developer time. Additionally, the conventional evaluation processes are often error prone and difficult to scale. For large numbers of cloud applications, keeping the evaluations current with the actual state of the cloud applications is often very difficult, if not impossible.

Therefore, there is a need for an evaluation approach that accurately models the cloud applications at the center of the development process to facilitate automation of compliance tasks, resiliency tasks, and threat modeling tasks.

SUMMARY

The present disclosure, through one or more of its various aspects, embodiments, and/or specific features or sub-components, provides, inter alia, various systems, servers, devices, methods, media, programs, and platforms for providing graph-based modeling of cloud applications to facilitate lifecycle management as well as resiliency, threat, and control evaluations.

According to an aspect of the present disclosure, a method for providing graph-based application modeling to facilitate application lifecycle management is disclosed. The method is implemented by at least one processor. The method may include receiving, via a graphical user interface, at least one input, the at least one input may relate to a request to design and develop at least one application; determining, based on the at least one input, a model development plan, the model development plan may include a universal schema that is compatible with a plurality of application development schemas; generating at least one model based on the model development plan and the at least one input, the at least one model may correspond to a topology of the at least one application; associating the at least one model with the at least one application; storing the at least one model and the association in a model repository; and exposing, via a network interface, the at least one model.

In accordance with an exemplary embodiment, the method may further include determining, based on the at least one model, at least one control and at least one configuration; associating the at least one control and the at least one configuration with the at least one application; and generating at least one script to execute the at least one control and the at least one configuration when the at least one application is executed.

In accordance with an exemplary embodiment, the method may further include enriching the at least one model with information relating to an operational state of the at least one application; and determining, by using the enriched at least one model, at least one vulnerability.

In accordance with an exemplary embodiment, the at least one vulnerability may include at least one from among an application vulnerability that corresponds to the at least one application and a system vulnerability that relates to propagation of the exploited application vulnerability in a system connected to the at least one application.

In accordance with an exemplary embodiment, the method may further include enriching the at least one model with information relating to an operational state of the at least one application; and determining, by using the enriched at least one model, at least one resiliency property corresponding to the at least one application.

In accordance with an exemplary embodiment, the method may further include capturing at least one event stream corresponding to the at least one application; inputting the captured at least one event stream into the at least one model; and determining, by using the at least one model, an operational state of the at least one application for a predetermined time.

In accordance with an exemplary embodiment, the method may further include receiving, via the graphical user interface, at least one user request, the at least one user request may include at least one from among a visualization request and a modification request; retrieving, from the model repository, the at least one model corresponding to the at least one user request; and rendering the at least one model to display via the graphical user interface in response to the at least one user request.

In accordance with an exemplary embodiment, the method may further include receiving, via the graphical user interface, at least one modification input, the at least one modification input may relate to a change to the at least one model; and updating the at least one model in the model repository based on the at least one modification input.

In accordance with an exemplary embodiment, the method may further include generating, by using a template model, the at least one model based on the model development plan and the at least one input; generating at least one instance model based on the template model when the application is deployed; and reconciling the application by comparing the at least one instance model with the template model.

According to an aspect of the present disclosure, a computing device configured to implement an execution of a method for providing graph-based application modeling to facilitate application lifecycle management is disclosed. The computing device including a processor; a memory; and a communication interface coupled to each of the processor and the memory, wherein the processor may be configured to receive, via a graphical user interface, at least one input, the at least one input may relate to a request to design and develop at least one application; determine, based on the at least one input, a model development plan, the model development plan may include a universal schema that is compatible with a plurality of application development schemas; generate at least one model based on the model development plan and the at least one input, the at least one model may correspond to a topology of the at least one application; associate the at least one model with the at least one application; store the at least one model and the association in a model repository; and expose, via a network interface, the at least one model.

In accordance with an exemplary embodiment, the processor may be further configured to determine, based on the at least one model, at least one control and at least one configuration; associate the at least one control and the at least one configuration together with the at least one application; and generate at least one script to execute the at least one control and the at least one configuration when the at least one application is executed.

In accordance with an exemplary embodiment, the processor may be further configured to enrich the at least one model with information relating to an operational state of the at least one application; and determine, by using the enriched at least one model, at least one vulnerability.

In accordance with an exemplary embodiment, the at least one vulnerability may include at least one from among an application vulnerability that corresponds to the at least one application and a system vulnerability that relates to propagation of the exploited application vulnerability in a system that is connected to the at least one application.

In accordance with an exemplary embodiment, the processor may be further configured to enrich the at least one model with information relating to an operational state of the at least one application; and determine, by using the enriched at least one model, at least one resiliency property corresponding to the at least one application.

In accordance with an exemplary embodiment, the processor may be further configured to capture at least one event stream corresponding to the at least one application; input the captured at least one event stream into the at least one model; and determine, by using the at least one model, an operational state of the at least one application for a predetermined time.

In accordance with an exemplary embodiment, the processor may be further configured to receive, via the graphical user interface, at least one user request, the at least one user request may include at least one from among a visualization request and a modification request; retrieve, from the model repository, the at least one model corresponding to the at least one user request; and render the at least one model to display via the graphical user interface in response to the at least one user request.

In accordance with an exemplary embodiment, the processor may be further configured to receive, via the graphical user interface, at least one modification input, the at least one modification input may relate to a change to the at least one model; and update the at least one model in the model repository based on the at least one modification input.

In accordance with an exemplary embodiment, the processor may be further configured to generate, by using a template model, the at least one model based on the model development plan and the at least one input; generate at least one instance model based on the template model when the application is deployed; and reconcile the application by comparing the at least one instance model with the template model.

According to an aspect of the present disclosure, a non-transitory computer readable storage medium storing instructions for providing graph-based application modeling to facilitate application lifecycle management is disclosed. The storage medium including executable code which, when executed by a processor, may cause the processor to receive, via a graphical user interface, at least one input, the at least one input may relate to a request to design and develop at least one application; determine, based on the at least one input, a model development plan, the model development plan may include a universal schema that is compatible with a plurality of application development schemas; generate at least one model based on the model development plan and the at least one input, the at least one model may correspond to a topology of the at least one application; associate the at least one model with the at least one application; store the at least one model and the association in a model repository; and expose, via a network interface, the at least one model.

In accordance with an exemplary embodiment, the executable code may further cause the processor to generate, by using a template model, the at least one model based on the model development plan and the at least one input; generate at least one instance model based on the template model when the application is deployed; and reconcile the application by comparing the at least one instance model with the template model.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
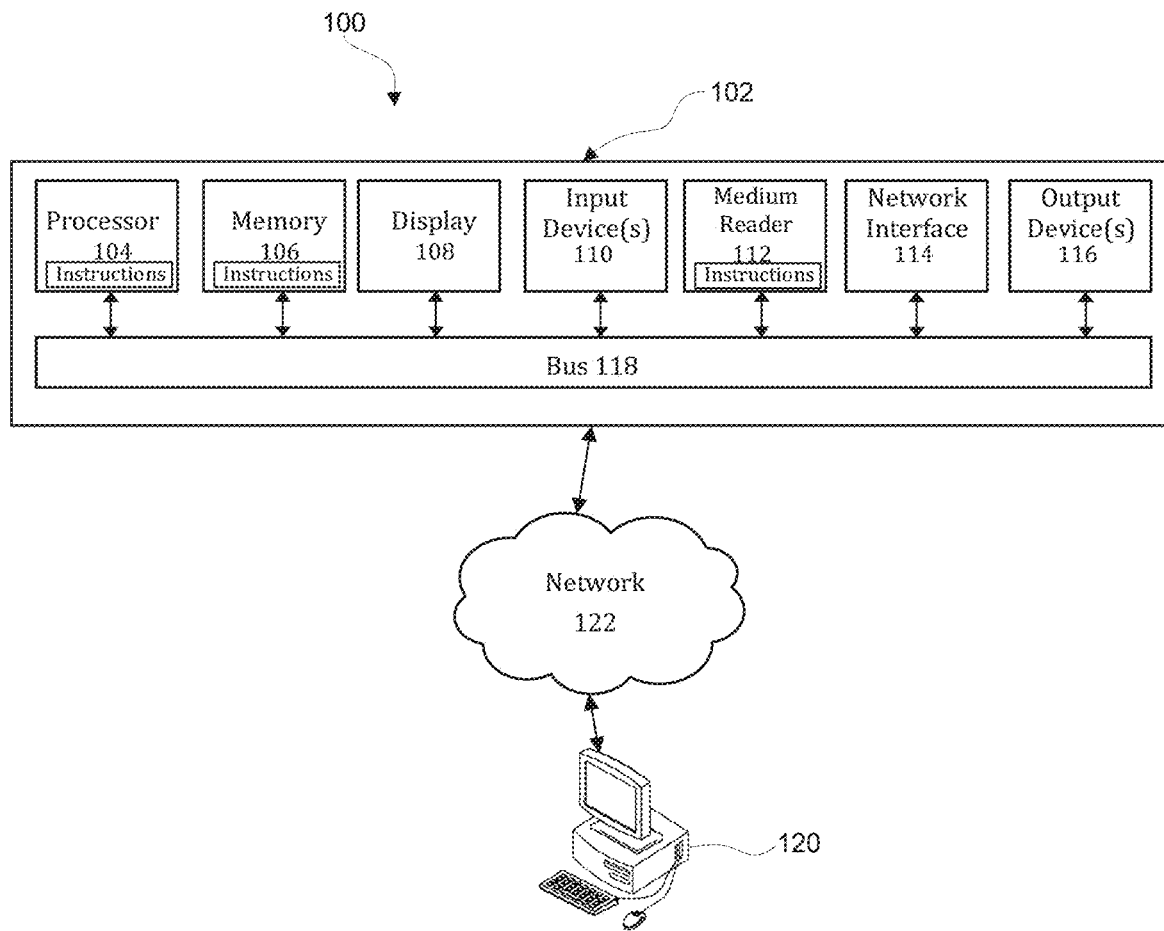
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing graph-based modeling of cloud applications to facilitate lifecycle management as well as resiliency, threat, and control evaluations.

Figure 2:
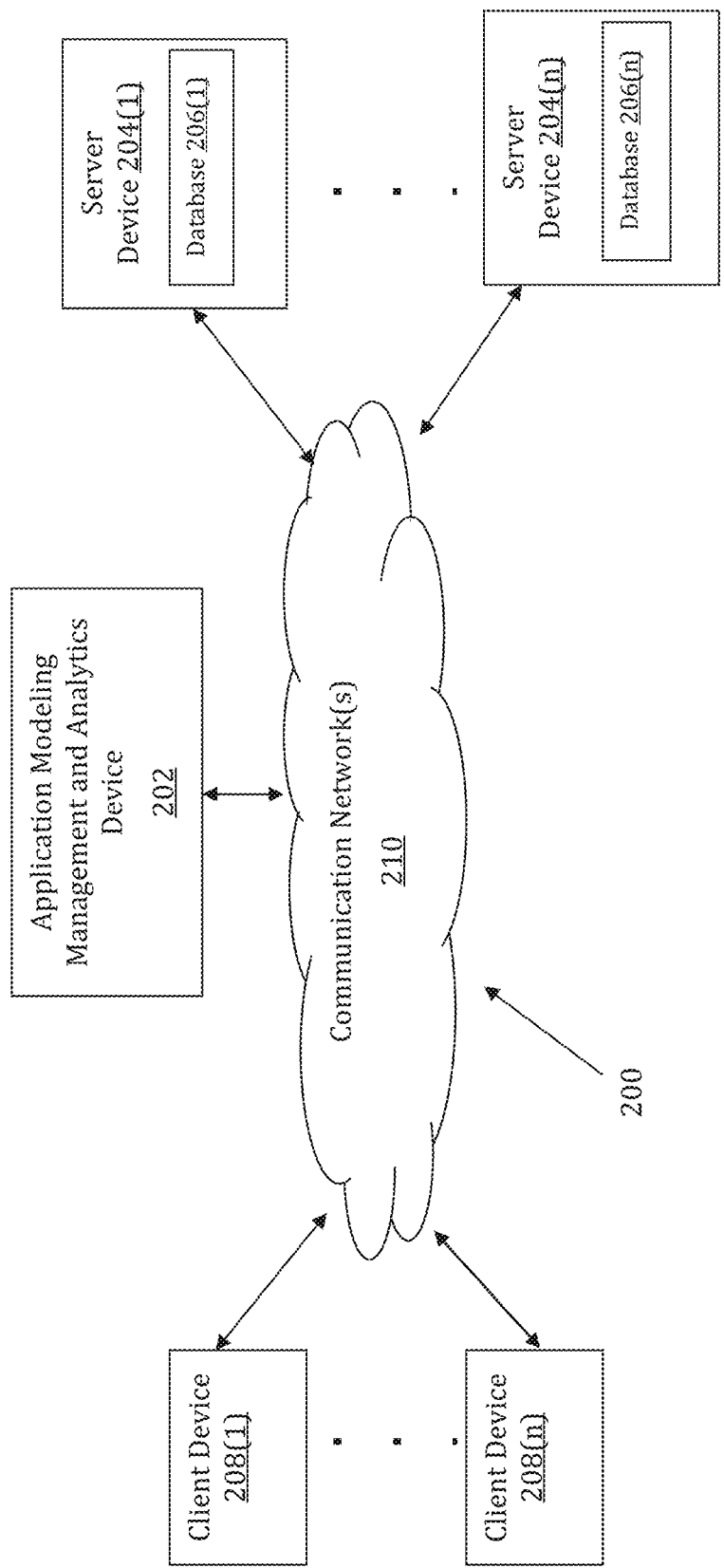
FIG. 2 illustrates an exemplary diagram of a network environment.

Referring to FIG. 2, a schematic of an exemplary network environment 200 for implementing a method for providing graph-based modeling of cloud applications to facilitate lifecycle management as well as resiliency, threat, and control evaluations is illustrated. In an exemplary embodiment, the method is executable on any networked computer platform, such as, for example, a personal computer (PC).

The method for providing graph-based modeling of cloud applications to facilitate lifecycle management as well as resiliency, threat, and control evaluations may be implemented by an Application Modeling Management and Analytics (AMMA) device 202. The AMMA device 202 may be the same or similar to the computer system 102 as described with respect to FIG. 1. The AMMA device 202 may store one or more applications that can include executable instructions that, when executed by the AMMA device 202, cause the AMMA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the AMMA device 202 itself, may be located in virtual server(s) running in a cloud-based computing environment rather than being tied to one or more specific physical network computing devices. Also, the application(s) may be running in one or more virtual machines (VMs) executing on the AMMA device 202. Additionally, in one or more embodiments of this technology, virtual machine(s) running on the AMMA device 202 may be managed or supervised by a hypervisor.

In the network environment 200 of FIG. 2, the AMMA device 202 is coupled to a plurality of server devices 204(1)-204(n) that hosts a plurality of databases 206(1)-206(n), and also to a plurality of client devices 208(1)-208(n) via communication network(s) 210. A communication interface of the AMMA device 202, such as the network interface 114 of the computer system 102 of FIG. 1, operatively couples and communicates between the AMMA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the AMMA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and AMMA devices that efficiently implement a method for providing graph-based modeling of cloud applications to facilitate lifecycle management as well as resiliency, threat, and control evaluations.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, telecommunications traffic engineering in any suitable form (e.g., voice, modem, and the like), Public Switched Telephone Network (PSTNs), Ethernet-based Packet Data Networks (PDNs), combinations thereof, and the like.

The AMMA device 202 may be a standalone device or integrated with one or more other devices or apparatuses, such as one or more of the server devices 204(1)-204(n), for example. In one particular example, the AMMA device 202 may include or be hosted by one of the server devices 204(1)-204(n), and other arrangements are also possible. Moreover, one or more of the devices of the AMMA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the AMMA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to application instance models, application template models, preventive controls, application policies, mapped asset data, generated definitions, and cloud events.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the AMMA device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the AMMA device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the AMMA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the AMMA device 202, the server devices 204(1)-204(n), or the client devices 208(1)-208(n), for example, may be configured to operate as virtual instances on the same physical machine. In other words, one or more of the AMMA device 202, the server devices 204(1)-204(n), or the client devices 208(1)-208(n) may operate on the same physical device rather than as separate devices communicating through communication network(s) 210. Additionally, there may be more or fewer AMMA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only telecommunications traffic engineering in any suitable form (e.g., voice and modem), wireless traffic networks, cellular traffic networks, Packet Data Networks (PDNs), the Internet, intranets, and combinations thereof.

Figure 3:
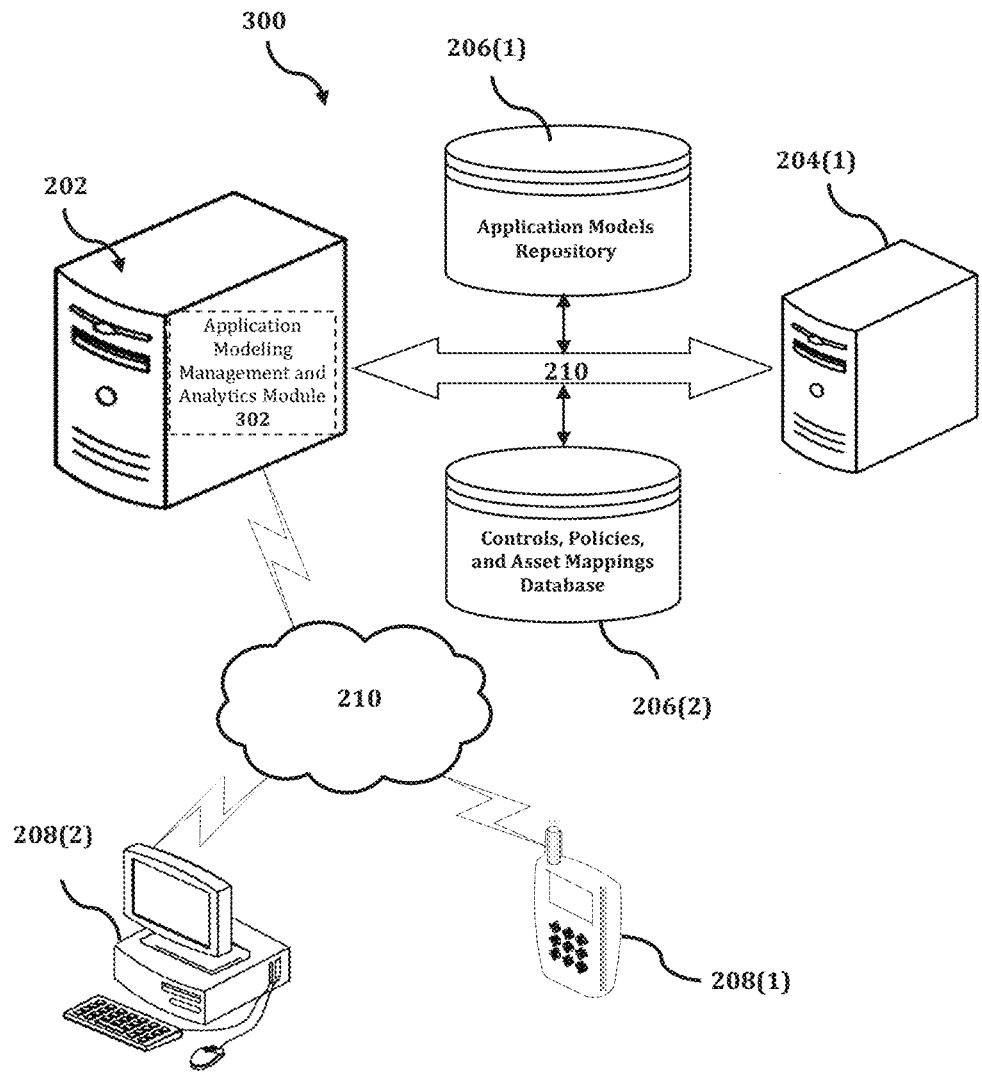
FIG. 3 shows an exemplary system for implementing a method for providing graph-based modeling of cloud applications to facilitate lifecycle management as well as resiliency, threat, and control evaluations.

The AMMA device 202 is described and shown in FIG. 3 as including an application modeling management and analytics module 302, although it may include other rules, policies, modules, databases, or applications, for example. As will be described below, the application modeling management and analytics module 302 is configured to implement a method for providing graph-based modeling of cloud applications to facilitate lifecycle management as well as resiliency, threat, and control evaluations.

An exemplary process 300 for implementing a mechanism for providing graph-based modeling of cloud applications to facilitate lifecycle management as well as resiliency, threat, and control evaluations by utilizing the network environment of FIG. 2 is shown as being executed in FIG. 3. Specifically, a first client device 208(1) and a second client device 208(2) are illustrated as being in communication with AMMA device 202. In this regard, the first client device 208(1) and the second client device 208(2) may be "clients" of the AMMA device 202 and are described herein as such. Nevertheless, it is to be known and understood that the first client device 208(1) and/or the second client device 208(2) need not necessarily be "clients" of the AMMA device 202, or any entity described in association therewith herein. Any additional or alternative relationship may exist between either or both of the first client device 208(1) and the second client device 208(2) and the AMMA device 202, or no relationship may exist.

Further, AMMA device 202 is illustrated as being able to access an application models repository 206(1) and a controls, policies, and asset mappings database 206(2). The application modeling management and analytics module 302 may be configured to access these databases for implementing a method for providing graph-based modeling of cloud applications to facilitate lifecycle management as well as resiliency, threat, and control evaluations.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the AMMA device 202 via broadband or cellular communication. Of course, these embodiments are merely exemplary and are not limiting or exhaustive.

Upon being started, the application modeling management and analytics module 302 executes a process for providing graph-based modeling of cloud applications to facilitate lifecycle management as well as resiliency, threat, and control evaluations. An exemplary process for providing graph-based modeling of cloud applications to facilitate lifecycle management as well as resiliency, threat, and control evaluations is generally indicated at flowchart 400 in FIG. 4.

Figure 4:
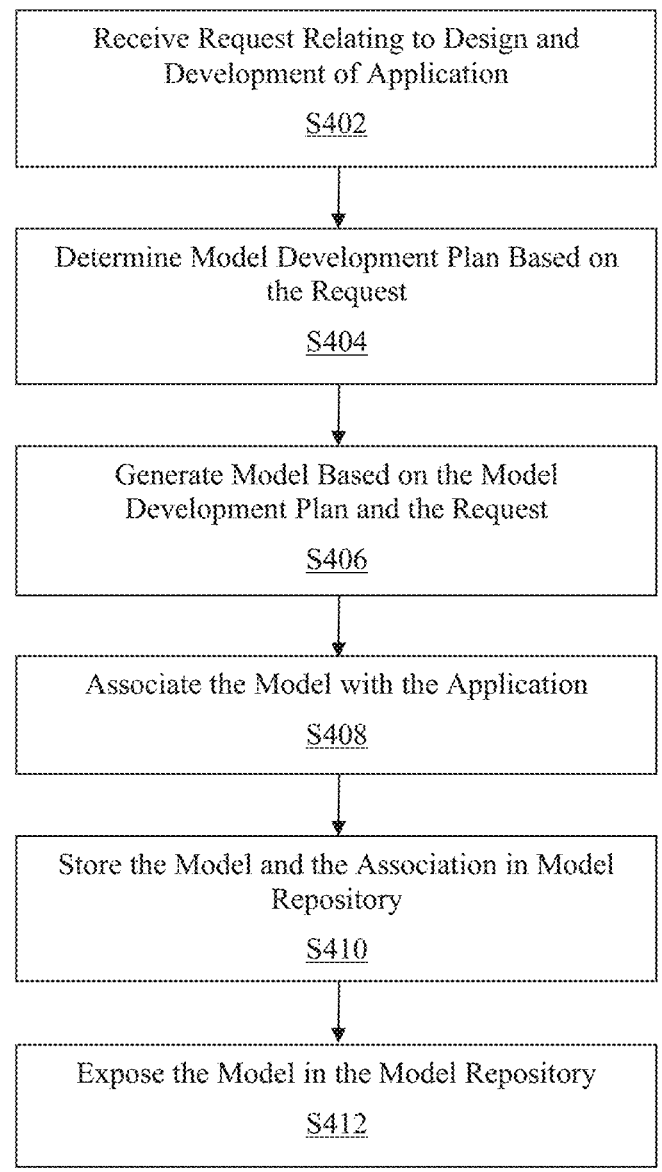
FIG. 4 is a flowchart of an exemplary process for implementing a method for providing graph-based modeling of cloud applications to facilitate lifecycle management as well as resiliency, threat, and control evaluations.

In the process 400 of FIG. 4, at step S402, an input may be received via a graphical user interface. The input may relate to a request to design and a request to develop an application. In an exemplary embodiment, the graphical user interface may correspond to a setup assistant such as, for example, a software wizard that leads a user through a series of well-defined steps to design and develop an application. The setup assistant may be created for each different application topology. In another exemplary embodiment, the input may include at least one from among a topology mapping and custom code that corresponds to the application to be designed and developed.

In another exemplary embodiment, the application may include software such as, for example, a cloud application that users can access primarily through a networked interface. As such, at least some of the application may be managed by a server and not locally on a user device. In another exemplary embodiment, the application may rely on remote servers to process logic that is accessed through an interface with a continual network connection. The application may be located on a remote data center in a cloud environment such as, for example, a private cloud environment and a public cloud environment. In another exemplary embodiment, the cloud environment may operate on infrastructure provided by a first-party cloud provider as well as a third-party cloud provider.

At step S404, a model development plan may be determined based on the input. The model development plan may correspond to predetermined guidelines for application development. In an exemplary embodiment, the model development plan may include at least one from among a plan to develop the model from scratch and a plan to modify an existing model based on the received input. Modification of an existing model may include identifying an existing model with similar characteristics and modifying the identified model based on the input. As will be appreciated by a person of ordinary skill in the art, the model development plan may be determined based on the input as well as additional information as required. For example, when insufficient information to generate the model development plan is determined, the graphical user interface may display a notification requesting additional information. In another exemplary embodiment, the model development plan may include a universal schema that is compatible with a plurality of application development schemas. The universal schema may relate to a flexible schema that enables the construction of models for any current or future cloud applications. For example, the universal schema may be usable to develop various different cloud applications, each of which may have difference schemas.

At step S406, a model based on the model development plan may be generated. In an exemplary embodiment, the model may illustrate a topology corresponding to the application. Custom code relating to a part of the application may be pointed to by the model to facilitate building of the application. The model may correspond to a characteristic of the application such as, for example, the nodes, relationships, and properties that comprise the application. In another exemplary embodiment, the model may express the application characteristics as a graph in a database. The graph may enable the model to be viewed as a multi-purpose figure such that, depending on how the model is examined, may express the internal infrastructure of the application, the data flows through the application, as well as identity and access management (IAM) configurations of the application.

In another exemplary embodiment, the graph may correspond to a data structure such as, for example, a non-linear data structure that includes nodes and edges. The nodes may be referenced as vertices and the edges may include connecting elements between any two nodes. In another exemplary embodiment, the graph may enable data in a database to be represented as nodes that are connected to each other via relationships. Both the nodes and the corresponding relationships may include properties that are unique to the data component.

In another exemplary embodiment, queries may be performed in terms of these relationship structures and properties. Therefore, the queries are only limited by what data the graph is designed to represent. As will be appreciated by a person of ordinary skill in the art, by using a graph schema, a look at a component of an application may enable an examination of where the component fits within the application's topology, the interactions of the component, and a complete set of known properties corresponding to the component. Additionally, the graph schema may also enable an examination of how the application interacts with other connected applications and cloud services. The ability to examine the interactions of the application may enable impact analysis of service outages as well as enable threat exposure analysis based on an understanding of application dependencies.

In another exemplary embodiment, the generated model may correspond to a template model. The template model may include an output of the application design and development phase. In another exemplary embodiment, the template model may include a generic representation of an application that is usable to develop instance models that correspond to the application. The template model may correspond to a preset format that is used so that the format does not have to be recreated each time development is initiated for the application. For example, a template model may indicate that the application operates in a single region, but the template model may not include identifying information regarding the region. In another exemplary embodiment, the template model may specify how large classless inter-domain routing (CIDR) ranges are for a virtual private network and individual subnets, but the template model may not specify the base internet protocol (IP) addresses or sizes of the CIDR ranges.

In another exemplary embodiment, an instance model may be created from a corresponding template model when the application is deployed. The instance model may then be populated with additional properties to reflect the state of the deployed application more accurately. In another exemplary embodiment, as the application changes during its runtime, the instance model may be updated to reflect the changes. The application changes may include the startup of a new associated instance as well as an occurrence of a failover event. By continuously updating the instance model, a collection of instance models in a networked environment may represent a near real-time cloud asset inventory for the networked environment.

In another exemplary embodiment, the instance model may be expressed in the same schema as other models in the networked environment. Based on this expression, the instance model may become subject to its own set of analytic tools. The analytic tools may help with postures such as, for example, runtime postures, forensic postures, analysis of security postures, resiliency postures, and control postures consistent with embodiments in the present disclosure.

At step S408, the generated model may be associated with the application. The generated model may be associated with the application by using a shared characteristic such as, for example, an application identifier. In an exemplary embodiment, the shared characteristic may be compiled together with the generated model. For example, the application identifier of the application may be compiled together with code that comprise the model. In another exemplary embodiment, the shared characteristic may be saved as data that provides information about other data such as, for example, as metadata of the generated model. As will be appreciated by a person of ordinary skill in the art, the generated model may be associated with the application such that the generated model may be identified by using an identifier of the application.

At step S410, the model and the association may be stored in a model repository. In an exemplary embodiment, the application model repository may correspond to a repository within a graph database. The graph database may include a database that utilizes a graph data structure that includes nodes and edges. The nodes may be referenced as vertices and the edges may include connecting elements between any two nodes. In another exemplary embodiment, the data in a graph database may be represented as nodes that are connected to each other via relationships. Both the nodes and the corresponding relationships may include properties that are unique to the data component.

At step S412, the model in the model repository may be exposed via a network interface for consumption. In an exemplary embodiment, the model may be exposed by using an application programming interface (API). The API may correspond to a software intermediary that allows applications to talk to each other. In another exemplary embodiment, the API may define interactions between the application by regulating the kinds of calls that can be made, how to make the calls, the data formats that should be used for the calls, as well as the conventions that the calls must follow. As will be appreciated by a person of ordinary skill in the art, the API may relate to a set of definitions and protocols for building and integrating application software.

In another exemplary embodiment, a user request may be received via the graphical user interface. The user request may include at least one from among a model visualization request and a model modification request. Then, from the model repository, the model corresponding to the user request may be retrieved. The retrieved model may be rendered for display via the graphical user interface in response to the user request.

In another exemplary embodiment, a modification input for the rendered model may be received via the graphical user interface. The modification input may relate to a desired change to the model. In response to the modification input, the model in the model repository corresponding to the modification input may be updated based on the desired change.

In another exemplary embodiment, for continuous integration and continuous deployment (CI/CD) pipeline integration as well as controls integration, at least one from among an application control and an application configuration may be determined for an application based on an associated model. The application control may include at least one from among a preventive control, a detective control, a reactive control, an inline control, and a compensating control.

In another exemplary embodiment, the inline control may include any application controls that form an integral part of running applications but are not classified as a preventive control, a detective control, and/or a reactive control. The inline control may include commonly used application controls such as, for example, web application firewall (WAF) controls and transport layer security (TLS) terminator controls that do not fall within at least one of the aforementioned classifications. Then, the application control and the application configuration may be associated with the application. A script to execute the application control and the application configuration when the application is executed may be generated after the association.

In another exemplary embodiment, programmatic analysis of the application model may enable the application control to be associated with the application by using a predefined set of rules. The application controls may be categorized into categories such as, for example, a preventive control in a preventive category, an inline control in an inline category, a detective control in a detective category, and a reactive control in a reactive category.

In another exemplary embodiment, the preventive control may check the application as part of a CI/CD pipeline. The preventive control may prevent an application deployment when problems are detected. For example, the preventive controls may include code scanning controls and configuration guardrail controls. In another exemplary embodiment, the inline controls may form an integral part of running applications. For example, the inline controls may include web application firewall (WAF) controls and transport layer security (TLS) terminator controls.

In another exemplary embodiment, the detective controls may check the application configuration and operation at runtime. The detective controls may trigger reactive controls when violations are detected. For example, the detective controls may include infrastructure configuration deviation checkers. In another exemplary embodiment, reactive controls may execute when triggered by detective controls. For example, reactive controls may include controls to shut down and/or reconfigure offending components. As will be appreciated by a person of ordinary skill in the art, the application control may relate to controls that execute either as an integral part of the application, or as a set of external facilities dealing with a running application state.

In another exemplary embodiment, a component of an analytics tool such as, for example, a control selection and parameterization engine (CSPE) may be incorporated into a software development kit (SDK) consistent with present disclosures. The CSPE may decide which controls to associate with the application and in which configuration. In another exemplary embodiment, at application deployment, the CSPE may determine which preventive controls to apply to the application as well as which controls to deploy alongside the application. The application, together with associated controls, may be deployed by generating and subsequently executing appropriate scripts.

In another exemplary embodiment, for threat modeling and monitoring, a model in the model repository may be enriched with information relating to an operational state of a corresponding application. The information may relate to how different endpoints are authenticated, the bills-of-materials for various executable images, and permissions granted to various components. By using the enriched model, a vulnerability may be determined for the corresponding information. The vulnerability may include at least one from among an application vulnerability that corresponds to the application as well as a system vulnerability that relates to propagation of the exploited application vulnerability in a system that is connected to the application.

In another exemplary embodiment, a template model may be subject to preliminary threat modeling analysis and an instance model may be analyzed at runtime. Threat modeling analysis for an application may include the discovery of a new vulnerability in a component of the application. A graph database query may be issued to find all network reachable web servers that include said component in corresponding bills-of-materials. Based on a result of the query, for each of the identified web servers, perform another graph database query to discover which additional servers were in contact with the identified web servers. Then, likely attack propagation scenarios may be distilled based on permissions granted to the graph nodes in question. As patches are rolled out, progress may be monitored, and a report may be generated when the vulnerability is no longer found on any running server. Finally, additional controls may be instituted and deployed to ensure that new servers with the vulnerability are no longer allowed to be deployed.

In another exemplary embodiment, for resiliency modeling and anomaly detection, a model in the model repository may be enriched with information relation to an operational state of a corresponding application. Resiliency properties for the application may be determined by using the enriched model. The modeling of resiliency properties may include identifying instances where excessive and unnecessary permissions are granted. For example, in instances where a security principal with write access to the database also has write access to the data backup. The modeling of resiliency properties may also include identifying instances where applications with very high uptime requirements run in insufficient number of regions/availability zones/under-provisioned auto-scaling groups. Similarly, the modeling of resiliency properties may include identifying and recommending resiliency design patterns such as, for example, sharding patterns, circuit breaker patterns, and graceful degradation patterns based on application topology analysis.

In another exemplary embodiment, the modeling of resiliency properties may include identifying a blast radius corresponding to a failure. Since the models may be programmed to interconnect, identifying all application and service dependencies may be possible via simple graph queries. Likewise, the modeling of resiliency properties may include estimating recovery time from said failures. The modeling of resiliency properties may also include a comparison of observed application behavior against the model to highlight unexpected behaviors such as, for example, a connection attempt between entities that the model has indicated as not able to communicate to each other and to flag said unexpected behaviors for further investigation.

In another exemplary embodiment, for forensic investigations and post-mortems, an event stream corresponding to an application may be captured. The event stream may relate to a stream of all events such as, for example, events corresponding to cloud resources starting up, shutting down, and changing configurations. The captured event stream may be inputted into a corresponding model in the model repository. Then, by using the model and the captured event stream, an operational state of the application may be determined for a predetermined time. The predetermined time may relate to any point in time in which a reconstructed model state is desired.

In another exemplary embodiment, the application modeling approach may enable near real-time mapping of cloud assets in a networked environment. This may be accomplished by capturing event streams emanating from the cloud as applications execute. The event streams may be captured by using an application and infrastructure monitoring tool such as, for example, AMAZON CLOUDWATCH. Corresponding event-driven architectures may allow for subsequent replay of these captured event streams. As such, an application state for any predetermined point in time may be reconstructed by using the captured event streams. As will be appreciated by a person of ordinary skill in the art, the cloud asset inventory may thus include a historical dimension.

Figure 5:
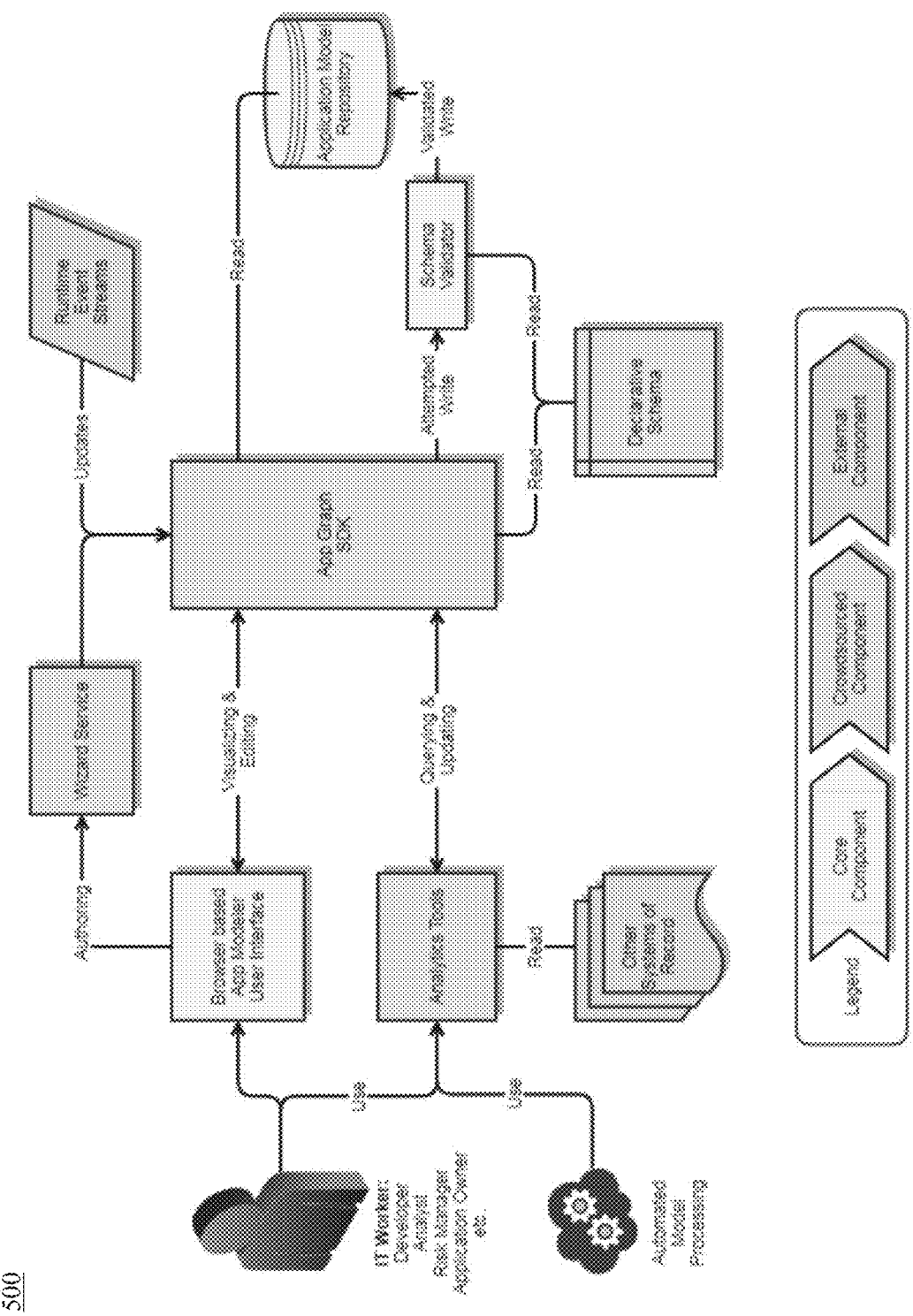
FIG. 5 is a diagram that illustrates a high-level system architecture that is usable for implementing a method for providing graph-based modeling of cloud applications to facilitate lifecycle management as well as resiliency, threat, and control evaluations, according to an exemplary embodiment.

FIG. 5 is a diagram 500 that illustrates a high-level system architecture that is usable for implementing a method for providing graph-based modeling of cloud applications to facilitate lifecycle management as well as resiliency, threat, and control evaluations, according to an exemplary embodiment. FIG. 5 corresponds to a high-level architecture that enables features such as, for example, an application design and development feature, a controls and CI/CD pipeline integration feature, a threat modeling and monitoring feature, a resiliency monitoring and anomaly detection feature, and a forensics and post-mortems feature.

As illustrated in FIG. 5, the architecture may correspond to an infinitely extensible development platform that enables a wide variety of solutions to be delivered. In FIG. 5, the software development kit (SDK), titled "AppGraph SDK," may intermediate requests from all parties that work with application models. The job of the AppGraph SDK may include insulating the caller, to the greatest extent possible, from internal schema changes.

Analytic tools written on top of the AppGraph SDK application programming interface (API) may be more robust than those that depend on intricate understanding of graph schema constructs. The AppGraph SDK may allow raw access to underlying graph-based representation for advanced scenarios. In an exemplary embodiment, both the AppGraph SDK and the analytic tools may be open sourced.

Runtime event streams may help to keep existing models current and may enable features relating to forensics and cloud asset inventories. Developed models may be stored in a graph database titled "application model repository" and may be constrained by a versioned declarative schema. In another exemplary embodiment, the versioned declarative schema may be open sourced and subjected to a rigorous governance process. The architecture arrangement in FIG. 5 allows the models to be available for a variety of information technology (IT) worker roles since the analytic tools may be specialized to the requirement of each IT worker role. Additionally, the AppGraph SDK may also be open to developers of automated model processing tools such as, for example, TERRAFORM renderers as well as of various preventive, detective, and reactive controls.

Figure 6:
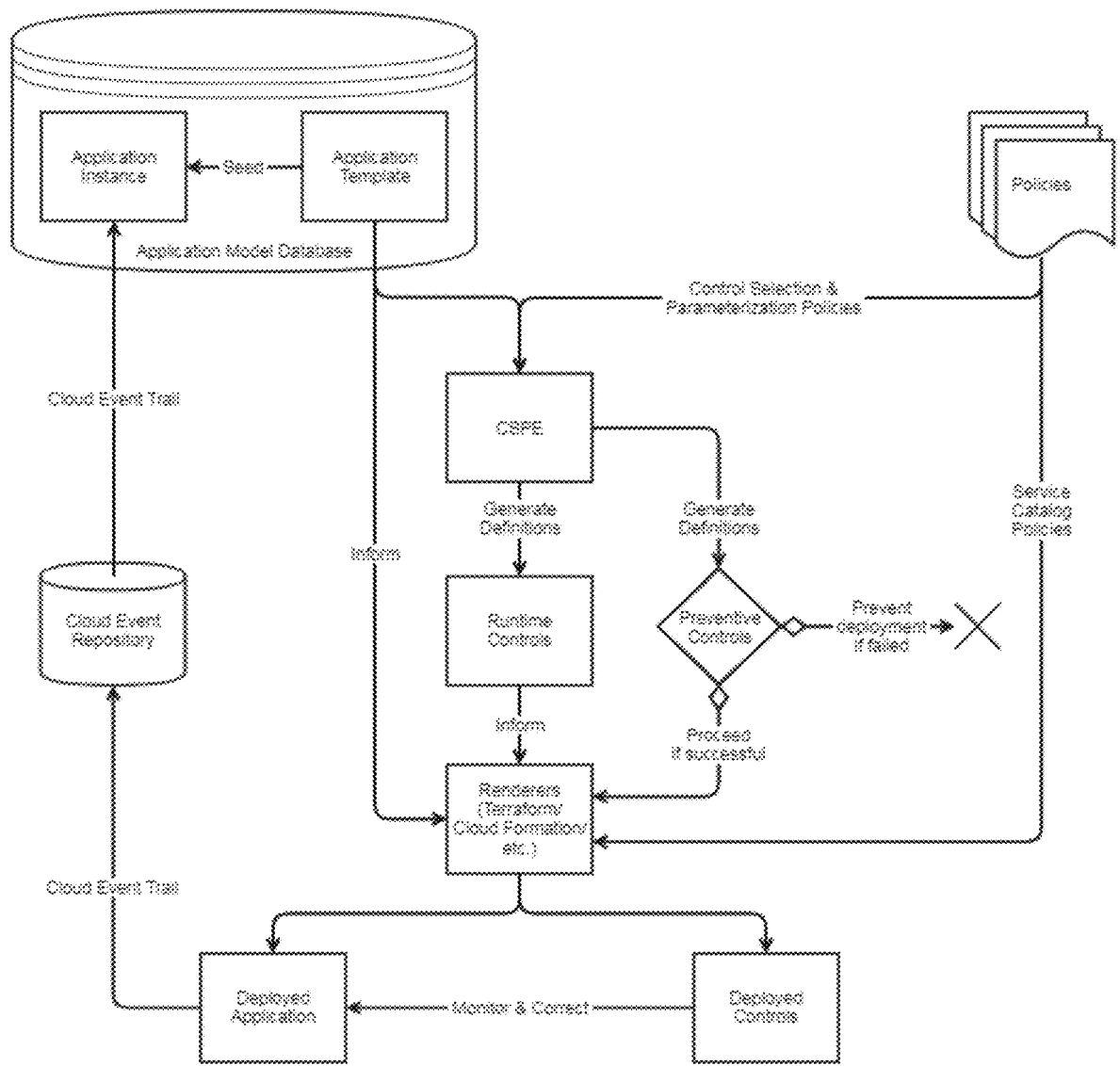
FIG. 6 is a diagram that illustrates a process for selecting, associating, and deploying controls for a corresponding application that is usable for implementing a method for providing graph-based modeling of cloud applications to facilitate lifecycle management as well as resiliency, threat, and control evaluations, according to an exemplary embodiment.

FIG. 6 is a diagram 600 that illustrates a process for selecting, associating, and deploying controls for a corresponding application that is usable for implementing a method for providing graph-based modeling of cloud applications to facilitate lifecycle management as well as resiliency, threat, and control evaluations, according to an exemplary embodiment.

In FIG. 6, a component of an analytics tool such as, for example, a control selection and parameterization engine (CSPE) may be incorporated into a software development kit (SDK) consistent with present disclosures. The CSPE may decide which controls to associate with the application and in which configuration. In another exemplary embodiment, at application deployment, the CSPE may determine which preventive controls to apply to the application as well as which controls to deploy alongside the application. The application, together with associated controls, may be deployed by generating and subsequently executing appropriate scripts.

Accordingly, with this technology, an optimized process for providing graph-based modeling of cloud applications to facilitate lifecycle management as well as resiliency, threat, and control evaluations is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure.

Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing graph-based application modeling to facilitate application lifecycle management, the method being implemented by at least one processor, the method comprising:

receiving, by the at least one processor via a graphical user interface, at least one input, the at least one input relating to a request to design and develop at least one application;

determining, by the at least one processor based on the at least one input, a model development plan, the model development plan including a universal schema that is compatible with a plurality of application development schemas;

generating, by the at least one processor, at least one model based on the model development plan and the at least one input, the at least one model corresponding to a topology of the at least one application;

associating, by the at least one processor, the at least one model with the at least one application;

storing, by the at least one processor, the at least one model and the association in a model repository; and exposing, by the at least one processor via a network interface, the at least one model.

2. The method of claim 1, further comprising:

determining, by the at least one processor based on the at least one model, at least one control and at least one configuration;

associating, by the at least one processor, the at least one control and the at least one configuration together with the at least one application; and generating, by the at least one processor, at least one script to execute the at least one control and the at least one configuration when the at least one application is executed.

3. The method of claim 1, further comprising:

enriching, by the at least one processor, the at least one model with information relating to an operational state of the at least one application; and determining, by the at least one processor using the enriched at least one model, at least one vulnerability.

4. The method of claim 3, wherein the at least one vulnerability includes at least one from among an application vulnerability that corresponds to the at least one application and a system vulnerability that relates to propagation of the exploited application vulnerability in a system that is connected to the at least one application.

5. The method of claim 1, further comprising:

enriching, by the at least one processor, the at least one model with information relating to an operational state of the at least one application; and determining, by the at least one processor using the enriched at least one model, at least one resiliency property corresponding to the at least one application.

6. The method of claim 1, further comprising:

capturing, by the at least one processor, at least one event stream corresponding to the at least one application;

inputting, by the at least one processor, the captured at least one event stream into the at least one model; and determining, by the at least one processor using the at least one model, an operational state of the at least one application for a predetermined time.

7. The method of claim 1, further comprising:

receiving, by the at least one processor via the graphical user interface, at least one user request, the at least one user request including at least one from among a visualization request and a modification request;

retrieving, by the at least one processor from the model repository, the at least one model corresponding to the at least one user request; and rendering, by the at least one processor, the at least one model to display via the graphical user interface in response to the at least one user request.

8. The method of claim 7, further comprising:

receiving, by the at least one processor via the graphical user interface, at least one modification input, the at least one modification input relating to a change to the at least one model; and updating, by the at least one processor, the at least one model in the model repository based on the at least one modification input.

9. The method of claim 1, further comprising:

generating, by the at least one processor using a template model, the at least one model based on the model development plan and the at least one input;

generating, by the at least one processor, at least one instance model based on the template model when the application is deployed; and reconciling, by the at least one processor, the application by comparing the at least one instance model with the template model.

10. A computing device configured to implement an execution of a method for providing graph-based application modeling to facilitate application lifecycle management, the computing device comprising:

a processor;

a memory; and a communication interface coupled to each of the processor and the memory, wherein the processor is configured to:

receive, via a graphical user interface, at least one input, the at least one input relating to a request to design and develop at least one application;

determine, based on the at least one input, a model development plan, the model development plan including a universal schema that is compatible with a plurality of application development schemas;

generate at least one model based on the model development plan and the at least one input, the at least one model corresponding to a topology of the at least one application;

associate the at least one model with the at least one application;

store the at least one model and the association in a model repository; and expose, via a network interface, the at least one model.

11. The computing device of claim 10, wherein the processor is further configured to:

determine, based on the at least one model, at least one control and at least one configuration;

associate the at least one control and the at least one configuration together with the at least one application; and generate at least one script to execute the at least one control and the at least one configuration when the at least one application is executed.

12. The computing device of claim 10, wherein the processor is further configured to:

enrich the at least one model with information relating to an operational state of the at least one application; and determine, by using the enriched at least one model, at least one vulnerability.

13. The computing device of claim 12, wherein the at least one vulnerability includes at least one from among an application vulnerability that corresponds to the at least one application and a system vulnerability that relates to propagation of the exploited application vulnerability in a system that is connected to the at least one application.

14. The computing device of claim 10, wherein the processor is further configured to:

enrich the at least one model with information relating to an operational state of the at least one application; and determine, by using the enriched at least one model, at least one resiliency property corresponding to the at least one application.

15. The computing device of claim 10, wherein the processor is further configured to:

capture at least one event stream corresponding to the at least one application;

input the captured at least one event stream into the at least one model; and determine, by using the at least one model, an operational state of the at least one application for a predetermined time.

16. The computing device of claim 10, wherein the processor is further configured to:

receive, via the graphical user interface, at least one user request, the at least one user request including at least one from among a visualization request and a modification request;

retrieve, from the model repository, the at least one model corresponding to the at least one user request; and render the at least one model to display via the graphical user interface in response to the at least one user request.

17. The computing device of claim 16, wherein the processor is further configured to:

receive, via the graphical user interface, at least one modification input, the at least one modification input relating to a change to the at least one model; and update the at least one model in the model repository based on the at least one modification input.

18. The computing device of claim 10, wherein the processor is further configured to:

generate, by using a template model, the at least one model based on the model development plan and the at least one input;

generate at least one instance model based on the template model when the application is deployed; and reconcile the application by comparing the at least one instance model with the template model.

19. A non-transitory computer readable storage medium storing instructions for providing graph-based application modeling to facilitate application lifecycle management, the storage medium comprising executable code which, when executed by a processor, causes the processor to:

receive, via a graphical user interface, at least one input, the at least one input relating to a request to design and develop at least one application;

determine, based on the at least one input, a model development plan, the model development plan including a universal schema that is compatible with a plurality of application development schemas;

generate at least one model based on the model development plan and the at least one input, the at least one model corresponding to a topology of the at least one application;

associate the at least one model with the at least one application;

store the at least one model and the association in a model repository; and expose, via a network interface, the at least one model.

20. The storage medium of claim 19, wherein the executable code further causes the processor to:

generate, by using a template model, the at least one model based on the model development plan and the at least one input;

generate at least one instance model based on the template model when the application is deployed; and reconcile the application by comparing the at least one instance model with the template model.

* * * * *